United States Patent [19]

Bernhard

[11] Patent Number: 4,565,581

[45] Date of Patent: Jan. 21, 1986

[54] NACREOUS PIGMENTS HAVING IMPROVED LIGHT FASTNESS, THEIR PREPARATION AND USE

[75] Inventor: Horst Bernhard, Schwarzenberg, Austria

[73] Assignee: Merck Patent Gesellschaft mit beschränkter Haftung, Darmstadt, Fed. Rep. of Germany

[21] Appl. No.: 453,048

[22] Filed: Dec. 27, 1982

[30] Foreign Application Priority Data

Dec. 24, 1981 [DE] Fed. Rep. of Germany ....... 3151343

[51] Int. Cl.$^4$ ............................ C08K 7/18; C09C 3/06
[52] U.S. Cl. ................................. 106/308 B; 106/291; 106/DIG. 3; 427/218; 427/219; 428/363; 428/404
[58] Field of Search .................... 106/308 B, 291, 309, 106/DIG. 3; 427/214, 218, 219; 428/363, 404

[56] References Cited

U.S. PATENT DOCUMENTS

| | | | |
|---|---|---|---|
| 3,008,844 | 11/1961 | Grunin | 106/193 |
| 3,087,828 | 4/1963 | Linton | 106/291 |
| 3,087,829 | 4/1963 | Linton | 106/291 |
| 3,342,617 | 9/1967 | Jackson | 106/291 |
| 3,650,790 | 3/1972 | Klenke et al. | 106/291 |
| 3,832,208 | 7/1974 | Jackson | 106/308 Q |
| 3,926,659 | 12/1975 | Bernhard et al. | 106/308 B |
| 4,134,776 | 1/1979 | Rieger et al. | 106/291 |

Primary Examiner—Howard S. Williams
Attorney, Agent, or Firm—Millen & White

[57] ABSTRACT

Nacreous pigments having improved light fastness are based on mica platelets coated with titanium dioxide and, optionally other additional metal oxides. These pigments carry an additional thin manganese oxide layer. The pigments are prepared in a process wherein mica is coated in aqueous suspension with one or more titanium dioxide hydrate layers and, optionally, with further metal oxide layers, mixed with the titanium dioxide hydrate or separately therefrom, and then is washed, dried and calcined. The process further comprises precipitating an additional layer of manganese hydroxide onto the base pigment, either directly after coating with the titanium dioxide hydrate and/or metal oxide layers or after the calcination thereof. The flakes are the washed, dried and calcined.

The new pigment can be used for pigmenting plastics, lacquers, paints and cosmetics, inter alia.

21 Claims, No Drawings

NACREOUS PIGMENTS HAVING IMPROVED LIGHT FASTNESS, THEIR PREPARATION AND USE

BACKGROUND OF THE INVENTION

The present invention relates to nacreous pigments having improved light fastness which are based on mica platelets coated with titanium dioxide and additionally, if appropriate, other metal oxides.

In the preparation of pigments, it is a fundamental desire to improve the light fastness. In particular, in order to improve the light fastness of mica flakes coated with titanium dioxide, numerous processes have already been proposed. Thus, German Pat. No. 1,467,468 (U.S. Pat. No. 3,087,828) proposes to apply a top layer of aluminum oxide, zirconium oxide, zinc oxide, tin oxide, antimony oxide, iron oxide, nickel oxide, cobalt oxide, copper oxide or chromium oxide for this purpose. German Offenlegungsschrift No. 2,106,613 proposes a subsequent treatment with silicate, and in German Offenlegungsschrift No. 2,215,191 and German Offenlegungsschrift No. 2,852,585, coatings of methacrylatochromium(III) chloride and of chromium hydroxide are applied respectively.

Nevertheless, there still exists a need for pigments which, on the one hand, have very good light fastness but, on the other hand, can also be prepared in an economical manner and provide interesting color effects.

SUMMARY OF THE INVENTION

Accordingly, it is an object of this invention to provide new pigments satisfying these needs.

Upon further study of the specification and appended claims, further objects and advantages of this invention will become apparent to those skilled in the art.

It has now been found that, surprisingly, very light-resistant and interesting pigments are obtained when the base pigment is coated with an additional manganese oxide layer. Surprisingly, this measure requires only extremely small amounts of manganese oxide.

This invention therefore relates to nacreous pigments having improved light fastness comprising platelets coated with titanium dioxide and, optionally, other metal oxides, wherein the pigments carry an additional thin manganese oxide layer.

The invention also relates to a process for preparing these pigments and to their use.

DETAILED DISCUSSION

A significant advantage of pigments according to this invention, in addition to their good light fastness, is, in particular, their very simple method of preparation. Furthermore, very interesting, and otherwise unobtainable, color effects can be achieved by the smaller degree of inherent coloring of the manganese oxide by combining the inherent color with suitable interference colors.

The preparation method according to this invention is based on known processes for preparing nacreous pigments, in particular the process described in German Patent No. 2,009,566, whose disclosure is entirely incorporated by reference herein. All details of this process of this invention are in accordance with this disclosure except as otherwise indicated herein.

In this process, mica flakes which, as a rule, have a diameter of about 5–200 μm and a thickness of about 0.1–5 μm are suspended in an aqueous solution adjusted to a pH value of about 0.5–5, in particular about 1.5–3.5, by means of a suitable acid, such as, for example, hydrochloric acid or sulfuric acid. A titanium salt solution is then allowed to flow slowly into the hot suspension at about 50°–100° C., preferably about 70°–80° C. The pH value of the suspension is maintained at an essentially constant value within the mentioned range by the simultaneous addition of a base.

Together with the titanium dioxide or as a separate layer, other colored or colorless metal oxides can also be applied to the mica flakes. Among these possibilities, the precipitation of tin dioxide is particularly preferred and is carried out either by the process of German Offenlagungsschrift No. 2,214,545 conjointly with the titanium dioxide or by the process of German Offenlegungsschrift No. 2,522,572 as a separate layer alternating with the titanium dioxide layer(s), in each case titanium dioxide being obtained in the rutile modification after conventional calcination. The disclosures of these references are incorporated by reference herein. These pigments based on rutile are distinguished by a particularly high light fastness which can be still further improved by the manganese oxide layer according to this invention. Desired $TiO_2$ modifications can be obtained in fully conventional fashion as discussed in these references.

The simultaneous precipitation of silicon dioxide together with one or more of the metal oxide layers in the preparation of the base pigments is also carried out in such a way that about 2–10 g of alkali metal silicate are added per liter in the precipitation of titanium dioxide and/or tin dioxide to neutralize the alkali metal hydroxide used. Usually, about 0.1–20 wt. % of $SiO_2$, based on the total weight of the $TiO_2$ layer is included. These co-precipitations can also be carried out using the procedures described in copending U.S. application Ser. Nos. 453,045 and 453,044 each of Dec. 27, 1982, whose disclosures are incorporated by reference herein.

These base pigments can be used either in the calcined or also in the non-calcined form for the further coating with manganese oxide. If a base pigment is used which has been calcined, in a customary manner the pigment is first suspended in water and the suspension is adjusted to a pH value above 3, preferably between 5 and 9. The precipitation of manganese oxide is then preferably carried out at an elevated temperature, in particular about 50–100° C., in such a way that a manganese(II) salt solution is slowly metered in, the pH value of the suspension being largely maintained at a constant value within the mentioned range by the simultaneous metering in of dilute bases, in particular ammonia.

Suitable manganese salts include in principle all salts stable under these conditions, such as, for example, manganese(II) chloride, manganese(II) bromide, manganese(II) iodide, manganese(II) sulfate, manganese(II) nitrate or manganese(II) acetate. Manganese compounds of higher valency can also be used when the pigment suspension contains a suitable reducing agent. Thus, solutions of alkali metal permanganates can be metered in when, for example, $H_2O_2$, oxalic acid, formic acid or the like, is used as a reducing agent. However, manganese(II) salts, and in particular manganese sulfate, manganese chloride and manganese nitrate, are preferably used. The manganese salt solution should be metered in at a rate such that the manganese hydroxide being precipitated deposits quantitatively onto the mica flakes, i.e., eventually none remain free in the dispersion. The rates of addition used in this step are so chosen that about $0.01-20 \times 10^{-5}$ mole of salts to be precipitated are supplied per minute and per m² of surface area to be covered.

After the manganese hydroxide layer has reached the thickness desired, the coating process is terminated and the pigments are separated off, washed, dried and calcined, analogously to the customary process. Temperatures of about 500°–1,000° C., in particular of about 700°–1,000° C., are used for the calcination which dehydrates the manganese hydroxide precipitate and converts it into the oxide.

The base pigments used as starting materials in the additional coating with manganese oxide have preferably not been calcined but, i.e., are non-calcined. Then, the coating stage with manganese hydroxide can follow directly without an intermediate isolation of the pigments. It can be performed immediately in the same suspension on the coating of the mica flakes with the titanium dioxide and, if appropriate, other metal oxides. For this purpose, the suspension is merely adjusted to a pH value above 3, preferably between 5 and 9, and the procedure described above is then followed. The pigments obtained in this one-stage process are qualitatively comparable to those pigments obtained in the two-stage process, so that the one-stage process offers considerable advantages.

By varying the thickness of the precipitated manganese oxide layer not only is the light fastness affected but also the color of the pigments. To improve the light fastness, at least about 0.05% by weight of manganese oxide, relative to the total pigment weight, preferably at least about 0.1% by weight of manganese oxide should be precipitated. Since the manganese oxide formed on calcination has an inherent color which, in certain circumstances, can become adversely conspicuous when the layers are very thick, no more than about 0.5% by weight of manganese oxide is, as a rule, precipitated. However, the inherent color of the manganese oxide can also be exploited in conjunction with suitable interference colors, to obtain attractive two-color effects.

Pigments obtained according to this invention have a markedly improved light fastness, so that the invention provides valuable new pigments. The pigments according to this invention can be used in the manner of existing pigments, namely, for example, for pigmenting plastics, paints or lacquers, but in particular also in toiletries and cosmetics. Owing to their improved light fastness, any applications in which the pigments are exposed to a pronounced degree to environmental influences, in particular, for example, in car paints, are also preferred.

Without further elaboration, it is believed that one skilled in the art can, using the preceding description, utilize the present invention to its fullest extent. The following preferred embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

45 g of potassium mica having a platelet size between 10 and 70 μm is coated in accordance with the process of German Offenlegungsschrift No. 2,522,572 in an aqueous suspension with alternate layers of titanium hydroxide and tin hydroxide until a yellow interference color is reached. In a step which differs from the process of German Offenlegungsschrift No. 2,522,572, a sodium hydroxide solution which contains about 4 g of $SiO_2$ per liter as water glass is used for the precipitation of $SiO_2$ at the start of the precipitation of the second tin hydroxide layer. After the yellow interference color has been reached, the suspension is decanted and again suspended in 1,000 ml of water, heated to 75° C., and adjusted to a pH value of 6.1 by means of 5% ammonia. There is slowly added a solution of 0.28 g of $MnSO_4 \cdot H_2O$ in 80 ml of water, the pH value being maintained at a constant value by metering in ammonia. The solids are then filtered off, washed, dried and calcined for 30 minutes at 800° C. A pigment is obtained which contains 0.15% by weight of manganese oxide. It is distinguished by high light fastness.

EXAMPLE 2

Potassium mica is coated in accordance with the process of German Offenlegungsschrift No. 2,522,572 until a yellow-red interference color has been reached, a sodium hydroxide solution containing water glass being used towards the end of the coating step as in Example 1. After the suspension has been decanted and the solids re-suspended in water, a solution of 0.12 g of $MnSO_4 \cdot H_2O$ in 40 ml of water is allowed to flow into the suspension at a pH value of 6. The solids are then filtered off, washed, dried and calcined for 30 minutes at 800° C. The base pigment is coated in the same way, separately, with 0.24 g and with 0.48 g of $MnSO_4 \cdot H_2O$. This produces pigments which contain 0.05, 0.1 and 0.2% by weight of manganese oxide, respectively.

Investigation of the light fastness of these pigments shows that 0.1% by weight of manganese oxide is already sufficient to stabilize the pigment.

EXAMPLE 3

Potassium mica is coated in accordance with the process of German Offenlegungsschrift No. 2,522,572 with titanium hydroxide and tin hydroxide until a green interference color has been reached. In contrast to Examples 1 and 2, a silicate-free sodium hydroxide solution is used. After the green interference color has been reached, the coating process is discontinued, and the suspension is adjusted to pH 6 by means of dilute ammonia. A solution of 0.12 g of $MnSO_4 \cdot H_2O$ in 40 ml of water is added. After filtration, washing, drying and calcination, a pigment is obtained which contains 0.05% by weight of manganese oxide. Analogous coating using 0.24 g and 0.48 g of $MnSO_4 \cdot H_2O$ produces, after the working up, pigments containing 0.1 and 0.2% by weight of manganese oxide. Investigation of the light fastness of these pigments shows that 0.1% by weight of manganese oxide is already sufficient to obtain substantial stabilization.

EXAMPLE 4

Potassium mica is coated in accordance with German Patent No. 2,009,566 with titanium hydroxide until a green interference color is reached. However, different from the process of German Patent No. 2,009,566, a sodium hydroxide solution is used which contains, per liter, 5 g of $SiO_2$. After the green interference color has been reached, the suspension is adjusted to pH 6 by means of 5% ammonia, and a solution of 0.1 g of $MnSO_4 \cdot H_2O$ in 40 ml of water is slowly added. Coatings are carried out analogously using 0.2 g and 0.4 g of $MnSO_4 \cdot H_2O$. After filtration, washing, drying and calcination, pigments are obtained which, respectively, contain 0.05, 0.1 and 0.2% by weight of manganese oxide. Investigation of the light fastness of these pigments, which, in contrast to the pigments of Examples 1-3, contain the titanium dioxide in anatase form, shows that a marked stabilization is also obtained in this case by the coating with manganese oxide. However, the light fastness is poorer than that of the corresponding rutile pigments and stabilization is also only obtained with relatively large amounts of manganese oxide.

EXAMPLE 5

A solution of 0.238 g of $MnSO_4 \cdot H_2O$ in 20 ml of water is added to a suspension in 800 ml of water of 40 g of a rutile mica pigment having a yellow interference color, the suspension having been heated to 75° C. and having a pH value of 6. The solids are then filtered off, washed, dried and calcined for 30 minutes at 800° C. A pigment is obtained which contains 0.25% by weight of manganese oxide and is very light-fast.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Nacreous pigments having improved light fastness comprising mica platelets whose surfaces are coated with a layer comprising titanium dioxide and which are coated with a thin top layer comprising manganese oxide, wherein the amount of manganese oxide is about 0.05-0.5% by weight, relative to total pigment weight.

2. Nacreous pigments of claim 1 wherein at least one metal oxide layer also contains about 0.1-20 wt. % of $SiO_2$.

3. Nacreous pigments of claim 2, comprising alternating layers of $TiO_2$ and tin oxide.

4. Nacreous pigments of claim 1 wherein the $TiO_2$ is in the rutile form.

5. Nacreous pigments of claim 1 comprising alternating layers of $TiO_2$ and tin oxide.

6. Nacreous pigments of claim 1 wherein the mica platelets are 5-200 $\mu$m in diameter.

7. Nacreous pigments of claim 1 further comprising a metal oxide other than $TiO_2$ in said layer comprising $TiO_2$.

8. Nacreous pigments of claim 1 further comprising at least one other layer of metal oxide other than $TiO_2$.

9. A process for preparing nacreous pigments having improved light fastness and comprising mica platelets whose surfaces are coated with a layer comprising titanium dioxide and which are coated with a thin top layer comprising manganese oxide, wherein the amount of manganese oxide is about 0.05-0.5% by weight, relative to total pigment weight,
comprising, coating the mica platelets in aqueous suspension by precipitating thereon at least one titanium dioxide hydrate layer and subsequently precipitating a top layer of manganese hydroxide onto the resultant coated platelets; and then washing, drying and calcining the coated platelets, wherein the precipitation of titanium-containing layers is achieved by suspending mica platelets in an aqueous solution of a pH of about 0.5-5, heating the solution to about 50°-100° C., adding a soluble titanium salt thereto and maintaining the solution pH substantially constant; and, in any titanium layers also comprising another metal oxide, simultaneously adding a soluble salt of the cation of said other oxide to the solution whereby the metal cation is also precipitated; and wherein the manganese precipitation is effected by adjusting a suspension of said platelets to a pH above 3 and a temperature of 50°-100° C., and then adding to the suspension a manganese salt and maintaining the pH value at an essentially constant value.

10. A process of claim 9 wherein the precipitation of manganese hydroxide is preceded by washing, drying and calcining of the pigments coated with $TiO_2$.

11. A process of claim 10 wherein the pigments are coated with $TiO_2$ and other metal oxides.

12. A process of claim 9 wherein the precipitation of manganese hydroxide follows directly after the last coating step with $TiO_2$ or other metal oxide.

13. A process of claim 9, wherein the titanium dioxide hydrate is precipitated such that $TiO_2$ is obtained in the rutile form after calcination.

14. A process of claim 9 wherein $SiO_2$ is coprecipitated in the formation of one or more of the metal oxide layers by adding a soluble silicate salt to the solution, and wherein said one or more metal oxide layers contains about 0.1-20 wt. % of $SiO_2$.

15. A process of claim 9 wherein the manganese hydrate is precipitated from a solution of a Mn(II) salt.

16. A process of claim 9 wherein the nacreous pigments further comprise a metal oxide other than $TiO_2$ in said layer comprising $TiO_2$ and wherein said process further comprises including in at least one $TiO_2$ layer another metal oxide by coprecipitating the corresponding hydrated metal oxide along with the hydrated titanium dioxide.

17. A process of claim 9 wherein the nacreous pigments further comprise at least one other layer of metal oxide other than $TiO_2$ and wherein said process further comprises coating said pigments with at least one separate metal oxide layer comprising a metal oxide other than $TiO_2$ by separately precipitating thereon the corresponding hydrated metal oxide.

18. In a composition comprising a base ingredient and a pearlescent pigment based on $TiO_2$ coated mica flakes, the improvement wherein the mica flakes have surfaces coated with a layer comprising titanium dioxide and which are coated with a thin top layer comprising manganese oxide.

19. A composition of claim 18 wherein the base ingredient is a plastic, lacquer, paint or toiletry formulation.

20. A composition of claim 18 wherein said mica flakes further comprise a metal oxide other than $TiO_2$ in said layer comprising $TiO_2$.

21. A composition of claim 18 wherein said mica flakes further comprise at least one other layer of metal oxide other than $TiO_2$.

* * * * *